Feb. 28, 1956  J. W. MARSHALL  2,736,159
BALE ASSEMBLER AND ALIGNER
Filed July 26, 1954  4 Sheets-Sheet 3

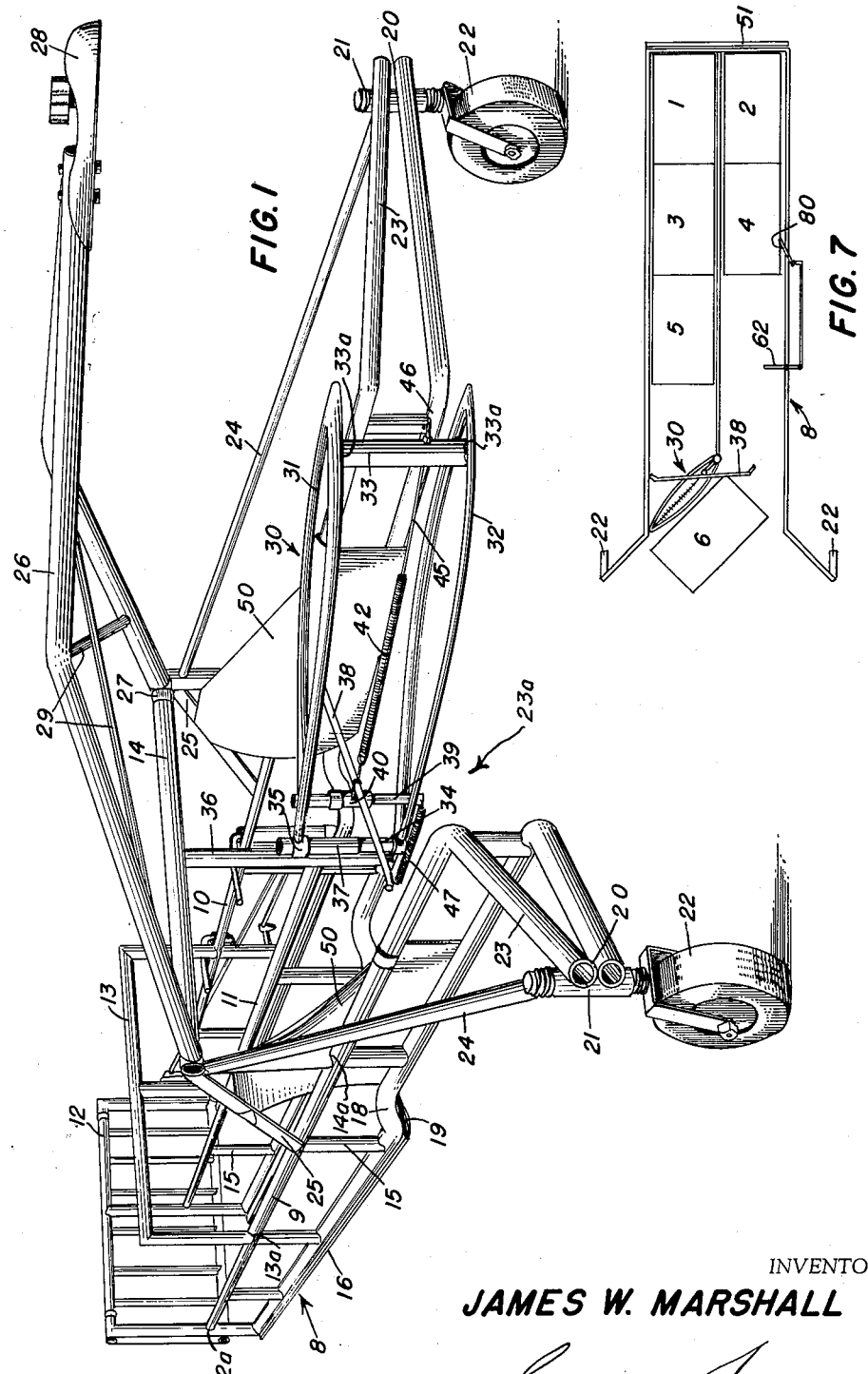

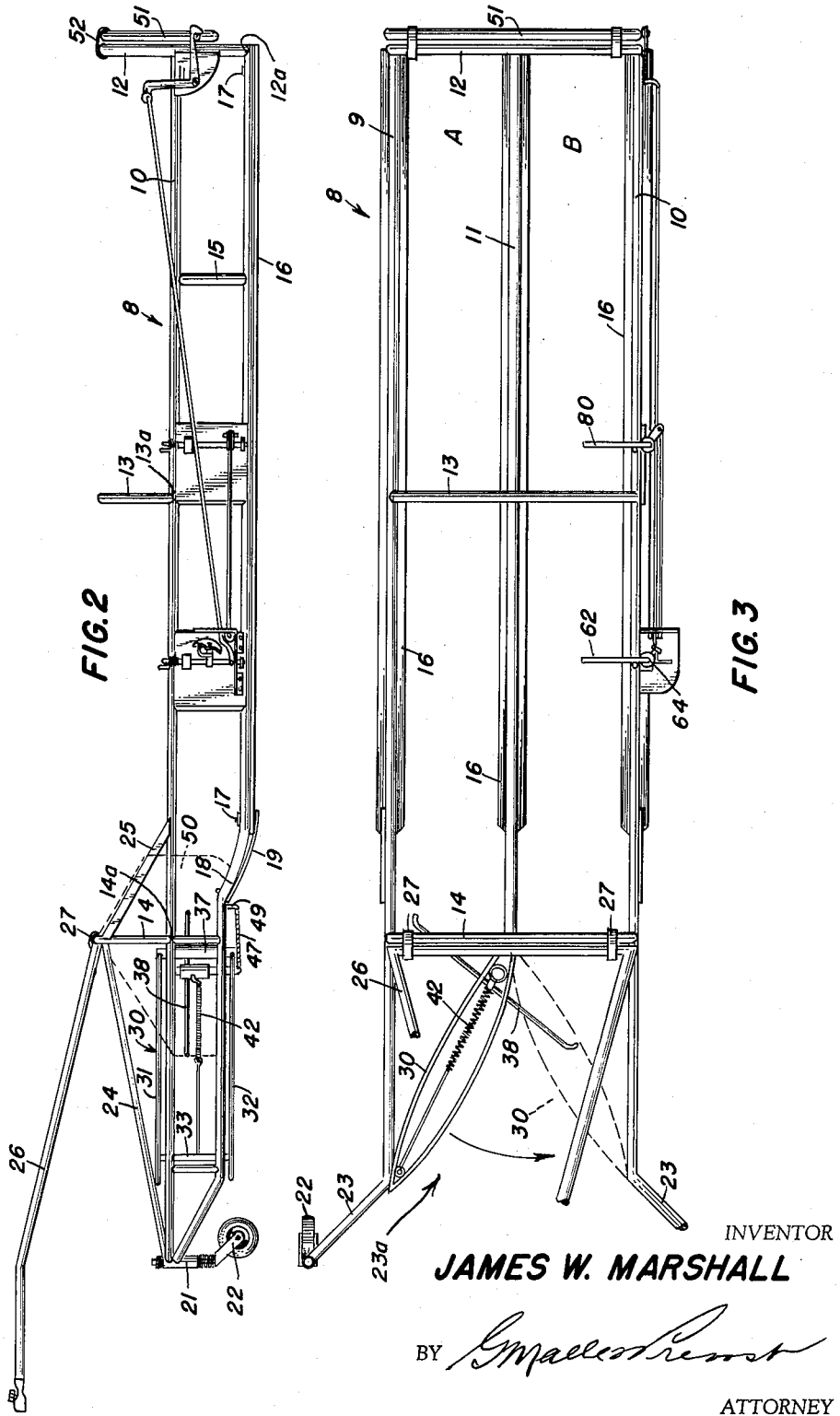

INVENTOR
JAMES W. MARSHALL

BY

ATTORNEY

Feb. 28, 1956

J. W. MARSHALL 2,736,159

BALE ASSEMBLER AND ALIGNER

Filed July 26, 1954

INVENTOR
JAMES W. MARSHALL

BY

ATTORNEY

United States Patent Office 2,736,159
Patented Feb. 28, 1956

2,736,159

BALE ASSEMBLER AND ALIGNER

James W. Marshall, Cozad, Nebr.

Application July 26, 1954, Serial No. 445,641

10 Claims. (Cl. 56—475)

This invention relates to a device for use in connection with a windrow hay baler, for gathering and intermittently discharging a plurality of bales of hay or the like, as they are fed from the baler, so as to place the bales in predetermined groups which may more easily be picked up with a hydraulic stacker loader. More specifically the invention consists in new and useful improvements in a multiple bale assembler and aligner and has for its object to provide a device of this character which may be attached to a conventional windrow baler and adapted to collect successive bales as they come from the baler, and automatically discharge a group of such bales, arranged in alignment for subsequent gathering as a group, by a hydraulic stacker loader.

Another object of the invention is to provide a multiple bale assembler and aligner, preferably designed for assembling six bales in two longitudinally extending rows of three each, and including means for automatically directing successive bales into alternate receiving chambers as they are delivered from the hay baler, to provide an aligned group of bales.

A further object of the invention is to provide a bale assembler and aligner of this nature, having an improved trip mechanism under the direct control of the bales being assembled, for automatically releasing a group of bales after a predetermined number of bales have been assembled.

Still another object of the invention is to provide a bale assembler and aligner in the nature of an elongated cage or frame work structure, adapted to be slid behind a baler on suitable runners, with the assembled bales in direct contact with the ground, so that frictional engagement causes their progressive movement to the discharge end of the cage.

A still further object of the invention is to provide apparatus of this character which is extremely simple in construction, yet possesses sufficient strength and rigidity to withstand continued hard usage.

Another object of the invention is to provide a bale assembler and aligner, the entire weight of which, together with the weight of the assembled bales, is borne directly by the ground over which the assembler travels, thus avoiding the stress and strain which would otherwise be placed upon the baler to which the assembler is attached.

With the above and other objects in view which will appear as the description proceeds, the invention consists in the novel features herein set forth, illustrated in the accompanying drawings and more particularly pointed out in the appended claims.

Referring to the drawings in which numerals of like character designate similar parts throughout the several views, Figure 1 is a perspective view of the bale assembler and aligner, from its forward end which in operation, is attached to a windrow hay baler.

Figure 2 is a view on a smaller scale, showing the apparatus in side elevation.

Figure 3 is a reduced top plan view of the device with parts broken away for clarity.

Figure 7 is a diagrammatic view showing the operation of the automatic trip mechanism, controlling the tail gate latch.

Figure 4:
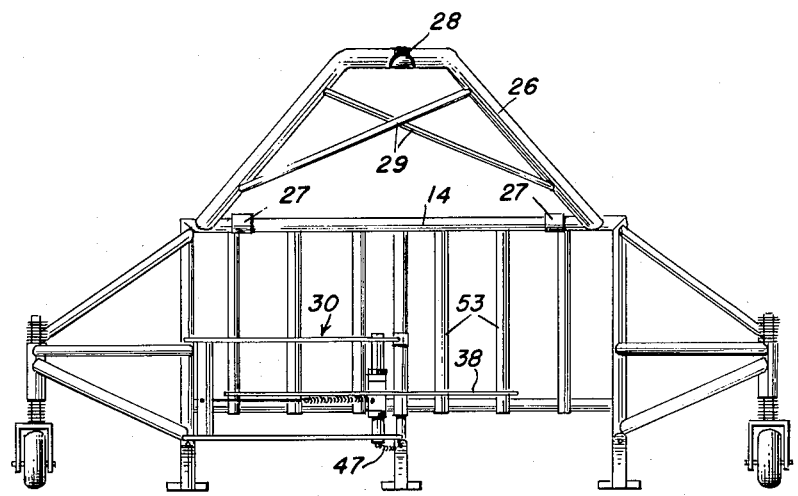
Figure 4 is a view in front elevation enlarged with respect to Fig. 2.

In the harvesting of hay, particularly where large numbers of bales are involved, an implement known as a hydraulic stacker loader is usually employed to follow the baler, pick up the bales and load them on a wagon. Naturally, if the bales are scattered over the field as they are formed by the baler, considerable time is unnecessarily lost in picking up individual bales. It therefore greatly facilitates the picking up operation if the bales can be assembled as they leave the baler and arranged in aligned groups which are deposited in suitable positions for gathering by the stacker loader. In order for the bales to be in a position for pick up by a stacker loader, they must be placed on edge so that the teeth of the loader will not catch the baling wire and most balers are designed to discharge the bales on edge. With the bales so arranged on the teeth of the loader, they can be stacked much more easily than would be the case if the bales were not arranged on edge.

By distributing the bales in aligned rows over a wider tooth area and with the bales lying across the teeth rather than lengthwise thereof, fewer broken teeth result, which not only conesrves time in the operation of gathering hay but greatly reduces the cost of repairs due to breakage.

As will be seen from Figure 1, the device comprising the present invention, includes an elongated frame work structure forming a bottomless cage generally indicated by the numeral 8 which consists of two parallel frame sections 9 and 10, separated by a longitudinally extending intermediate frame section 11, forming a central partition. These frame sections are formed of pairs of vertically spaced lengths of iron pipe, of 1¼ inch inside diameter, and are reinforced and supported by three transverse arch members 12, 13 and 14, also formed of 1¼ inch iron pipe. The arch members are evenly spaced from rear to front of the cage 8 and the pipes of the side frames and intermediate frame are welded as at 12a, 13a and 14a, to the respective legs of the arches, which thus serve to maintain the desired vertical spacing of the pipes to provide retaining walls of sufficient height to adequately support a series of bales against lateral displacement. It is of course understood that the legs of the arches are sufficiently high to elevate their respective cross members so as to clear bales moving through the cage, as will later appear.

In order to add strength and rigidity to the cage structure, additional short lengths of vertical pipes 15 may be installed between the horizontal pipes of the frame sections at suitably spaced intervals, as seen in Figures 1 and 2. Immediately beneath the cage portion 8, the lower pipe members of the three frame sections, are provided with ground engaging runners or skids 16, forming a sled-like support for the cage. The runners 16 may be bolted or otherwise secured to the lower pipes as at 17, and are preferably formed of suitable lengths of one inch by four inch hard wood.

At the forward end of the cage 8 the lower pipes of each frame section are offset vertically as at 18 and then continue parallel with the upper pipes of their respective sections. This provides an elevated frame portion immediately in advance of the main cage 8 so that the shuttle gate hereinafter described, is supported in raised position with respect to the ground. Preferably, the offset portions of the lower pipe members of the frame sections are provided with scrap metal strips 19 which underlie the pipe members and the forward portions of respective runners 16, as best seen in Figure 2. These strips 19 are shaped to the contour of the offset portions of the pipes and act as the advance noses of the runners, to provide a smooth sliding movement and eliminate the possibility of dirt and weeds clogging up in front of the runners.

The forward extremities of the side frames 9 and 10 are bent outwardly at an angle as shown in Figures 1 and 3, and the ends of their respective pipe members converge as at 20, where they are welded or otherwise secured to vertical supports 21 for casters 22. The outwardly flaring portions 23 of the side frames jointly form a converging throat or entrance opening 23a to facilitate the feeding of bales discharged from the baler, to the cage 8 as will later appear.

The caster supports 21 are preferably braced by diagonal pieces of pipe 24 which extend between the respective supports and the forward arch member 14, and additional rear angular braces 25 may be provided between the forward arch member 14 and an intermediate point on the respective side frames 9 and 10.

A substantially triangular draw bar 26 is hingedly connected to the cross member of the forward arch 14 by metal straps 27 and its forward end is provided with a suitable connecting clamp or hitch 28 by means of which the draw bar may be hingedly attached to the rear end of a baling machine (not shown). The apex of the triangular draw bar supports the hitch 28 and diagonal braces 29 may be provided adjacent the hinged end portion, both to lend support and to facilitate retention and delivery of the bales.

Figure 5:
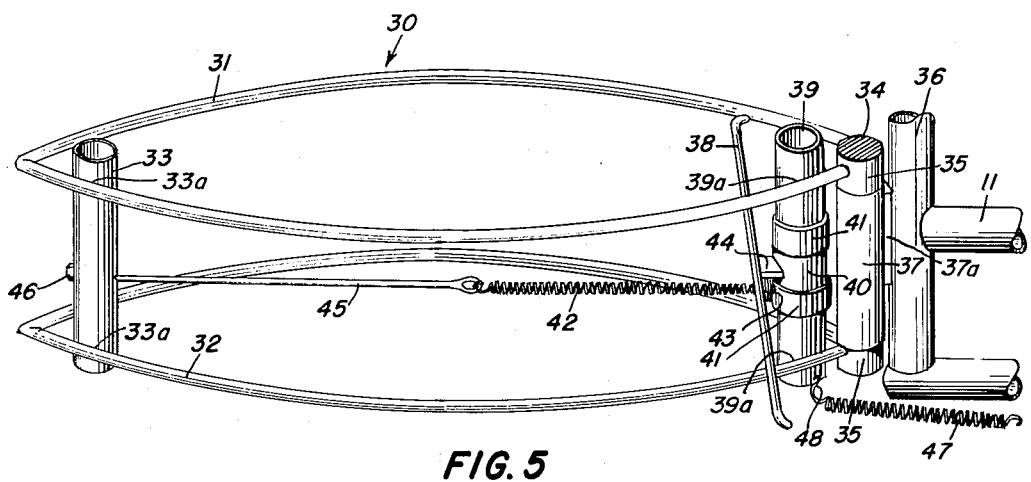
Figure 5 is an enlarged detailed perspective view of the bale shuttling gate.

As best seen in Figure 3, the cage 8 is divided longitudinally by the central frame member or partition 11, into two chambers A and B each of which is open to the main entrance opening 23a and in order to deliver successive bales into alternate chambers, I provide a shuttle gate 30 at the forward end of the cage 8. This shuttle gate is preferably formed of three-quarter inch pipe arranged in two vertically spaced, substantially elliptical sections 31 and 32, secured together at opposite ends by vertical posts 33 and 34. The forward connecting post 33 is preferably welded as at 33a, to the inner sides of the respective elliptical sections 31 and 32, while the rear ends of these sections are pivotally connected to the rear post 34 by means of collars 35, welded to the ends of the pipes of sections 31 and 32, as best seen in Figure 5. A supporting bracket or sleeve 37 is welded as at 37a to the forward side of upright 36 which extends between the horizontal pipes of intermediate frame 11 and the cross member of the forward arch 14. This sleeve 37 embraces the intermediate portion of post 34 and presents the extremities of the latter for hinged engagement by the two collars 35 at the rear of gate 30. The gate 30 is thus capable of a swinging movement from left to right about the axis of the rear post 34, to alternately close the entrances to the chambers A and B of the cage 8, as will later appear.

As before stated, this shuttle gate 30 is designed to automatically shift from side to side to alternately shuttle successive bales into the chambers A and B and is controlled by the bales themselves. This automatic operation is affected by a transverse trip lever 38 which is pivotally mounted intermediate its ends between the elliptical sections 31 and 32, on an auxiliary upright post 39 which is vertically supported within the ellipses 31, 32 adjacent their rear ends and in forwardly offset relation to the hinge supporting post 34. The post 39 is preferably welded as at 39a, to the adjacent pipes forming the ellipses 31 and 32 so as to form an axis for the shuttle gate trip lever 38. Any suitable means may be employed for pivotally mounting the trip lever or cross bar 38 on the upright 39, that shown in the drawings, consisting of a collar 40 rotatably embracing the post 39 intermediate its ends and retained in the desired vertical relationship by means of fixed collars 41 spaced on either side thereof. A coil spring 42 is connected as at 43, to the center of the trip lever 38 which is offset slightly forwardly with respect to the hinge collar 40, by means of a bracket 44, as seen in Figure 5. The opposite end of the spring 42 is connected to an adjustable rod 45 which extends forwardly through a suitable opening in post 33 and is threaded to receive a retaining and adjusting nut 46, whereby the tension of spring 42 may be regulated as desired.

A second coil spring 47 is secured between the lower end of the offset post 39 as at 48, and a depending fixed bracket 49 on the under side of the intermediate frame 11. This spring 47 is designed to effect a "snap action" on the gate 30 as the latter passes dead center in either direction, with respect to its pivotal axis 34. Thus, the spring reaches its extreme extension when the post 39 and gate 30 are on dead center or longitudinally aligned with the fixed bracket 49 and intermediate frame 11, and when the gate passes this dead center position in either direction, the spring automatically retracts and causes the gate to continue in that direction until its limit is reached. The gate 30 is of minimum weight so that it will swing easily from side to side.

In operation, as a bale enters the forward portion of the cage it engages one end of the spring loaded trip lever 38 and presses it to one side by the hinge action of collar 40 on post 39, thus extending the upper spring 42 and pulling the gate 30 over in such a way as to reduce the strain on spring 42. The over center spring 47 assists in closing the gate after the gate has passed center and holds the gate in a diagonally closed position, ready for the next bale which then encounters the opposite side of the gate 30 and is directed to the appropriate chamber. In other words, the bale itself and the over center spring, operate together to close the gate behind the bale as it enters the chamber and the gate automatically directs successive bales to alternate chambers A and B.

In order to assist in the control of the bales as they pass the shuttle gate 30, it may be desirable to provide side wings 50 of sheet metal on both of the side frame sections at points adjacent the shuttle gate. These wings will cooperate with the shuttle gate to guide the bales into the proper chambers.

The rear end of the cage 8 is provided with a tail gate 51, hingedly connected to the cross member of rear arch 12 by means of strap iron connections 52, so that the gate normally rests in closed position under its own weight. The gate 51 is preferably also formed of suitable lengths of pipe welded together to form a rectangular frame and a series of transversely spaced vertical pipes 53 are preferably welded between the upper and lower pipes of the gate as shown in Figure 4, to retain the bales until the gate is automatically released by means now to be described.

A hook-type latch 54 is pivotally mounted at 55 on a mounting plate 56, welded to the outer side of the side frame 10 at the rear end of the cage. A spring 57 connected to an offset arm or crank 54ª, of latch 54, tends to normally retain the latch in locked position over a lug 58 projecting from the side of the gate 51.

The control mechanism for the latch 54 includes primary and secondary trip mechanisms 59 and 60 respectively. The primary trip mechanism 59, although normally inoperative, is adapted to actuate the latch 54 at predetermined intervals, through connecting means which are conditioned for operation by the secondary trip mechanism 60.

Figure 6:
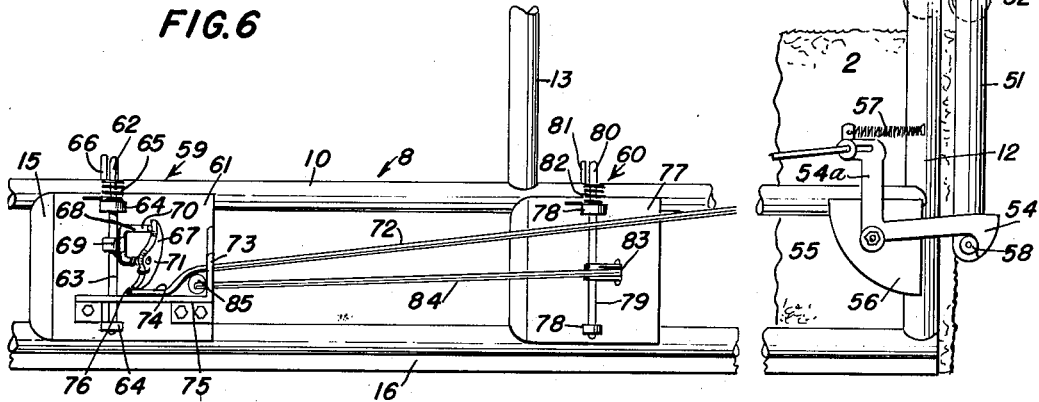
Figures 6, 6a and 6b are enlarged fragmentary details, illustrating progressive stages in the operation of the tail gate trip mechanism.
Figure 6A:
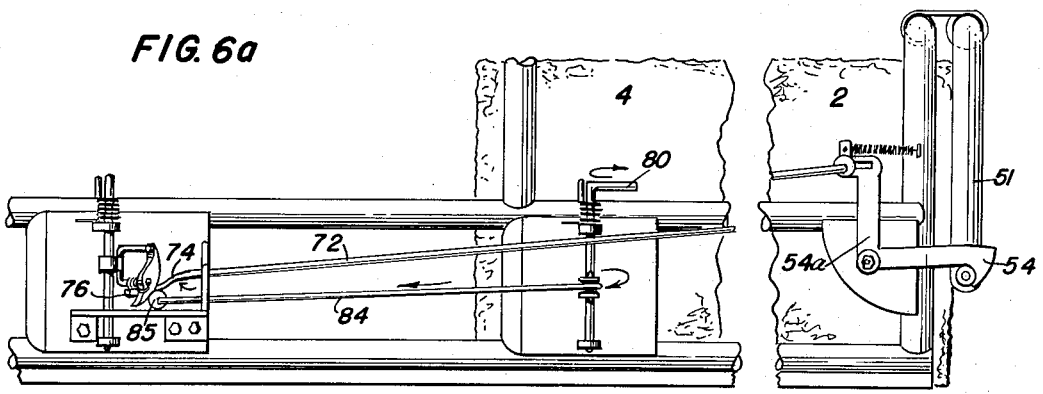
Figure 6B:
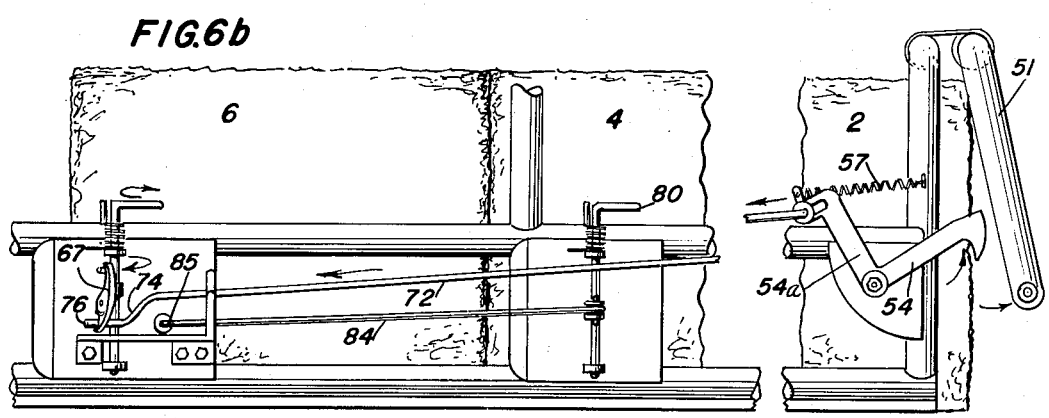

Turning now to Figures 3 and 6 to 6b, it will be seen that a primary trip supporting plate 61 is welded to the outer sides of the pipes forming the side frame 10, at a forward point on the cage 8, along side the chamber B. A right angular trip lever 62 having a vertical leg 63, is rotatably mounted in bearing brackets 64 which are welded in vertically spaced relation on the outer face of the plate 61, the horizontal lever portion 62 being rotatable through an arc which extends into the chamber B. A spring member 65 on the vertical leg 63 normally urges the trip member 62 into engagement with a stop pin 66, so that it overlies the chamber B immediately above the top pipe of the side frame 10. A pawl member 67 is pivotally mounted intermediate its ends, on the lower leg of a substantially U-shaped yoke 68, fixed to the side of the vertical leg 63 of the primary trip lever 62, as at 69. The pawl member 67 is preferably substantially crescent shaped with the concave portion of its upper end projecting beyond and lying behind the upper leg 70 of the U-shaped yoke 68, a spring 71 normally tending to rotate the pawl in counter clockwise direction into engagement with the top leg 70 of the yoke.

A trip rod 72 is pivotally mounted at one end on the crank lever 54a of the latch 54, its opposite end extending forwardly through a guide bracket 73, fixed to the outer face of the mounting plate 61. The forward extremity of the trip rod 72 is downwardly offset as at 74 and rests slidably on the horizontal flange 75 of an angle iron which is bolted or otherwise secured to the outer face of the plate 61. As will be seen from Figure 6, the forward end of the main trip rod 72 is bent outwardly at right angles as at 76 to form a hook-like abutment which lies slightly in advance of the normal position of the pawl 67, the pawl being positioned on the vertical leg 63 of the main trip lever 62, sufficiently above the abutment 76 to provide for a clearance between the lower end of the pawl 67 and the abutment 76, upon the rotation of the primary trip lever 62. In other words, with the parts in the position shown in Figure 6, the rotation of the trip lever 62 would have no effect upon the main trip rod 72.

The secondary trip mechanism 60 includes a similar mounting plate 77, welded to the outer sides of the pipes of side frame 10 and having bearing brackets 78 to support the vertical leg 79 of a right angular trip lever 80. The trip lever 80 like trip lever 62, is rotatable in an arc which overlies the chamber B and is normally urged inwardly over the chamber into engagement with a stop pin 81, by means of a spring 82. The central portion of the vertical leg 79 of the trip lever 80 carries an outwardly projecting crank arm 83, to which is pivotally connected one end of a secondary or conditioning rod 84, the forward end of which projects through the guide bracket 73 on the plate 61. The forward extremity of the conditioning rod 84 carries a roller member 85 which normally underlies the downwardly offset portion 74 of the main trip rod 72 and rests slidably upon the outwardly projecting flange 75 on the plate 61.

Thus, upon rotation of the secondary trip lever 80, the rod 84 is moved forwardly by the crank arm 83 so that its roller 85 cams the forward end of the main trip rod 72 upwardly, to bring its hook abutment 76 into line for engagement by the lower end of the pawl 67, when the primary trip lever 62 is rotated. The sequence of operation of the trip mechanism is illustrated in Figures 6 to 6b. Figure 6 shows the normal positions of the trip elements, Figure 6a shows the main trip rod 72 conditioned by conditioning rod 84, for engagement by the pawl 67, and Figure 6b shows the final tripping action effected by the rotation of the main trip lever 62 to release the latch 54.

In operation, this device is attached to the discharge end of the baling apparatus by means of the hitch 28 and is pulled along the ground immediately behind the baler. As the bales are successively discharged from the baler they drop edgewise on the ground immediately in front of the shuttle gate 30 which automatically and alternately directs the bales into the chambers A and B, of the cage 8. The first bale 1 would normally be directed into chamber A and would have no effect whatever upon the trip mechanism as it moves rearwardly with respect to the chamber by frictional engagement with the ground until it abuts the tail gate 51 where it stops. However, as bale 1 enters chamber A it engages the trip rod 38 and closes the shuttle gate 30 diagonally behind it, so that when bale 2 encounters the gate 30 it is shuttled to chamber B. Bale 2 first trips the main trip lever 62 in passing, but as the conditioning rod 84 is in its normal down position, the main trip rod 72 is not aligned for engagement by the pawl 67 and therefore the latch 54 remains locked. The same is true with respect to the secondary trip lever 80 which is also tripped by bale 2 without affecting the latch 54. Obviously by the time bale 2 has reached the secondary trip lever 80, the primary trip lever 62 has turned to inactive position by the action of its spring 65.

Bale 2, having closed the gate 30 behind it over the entrance to chamber B, the gate is now in position to shuttle bale 3 into chamber A where it is forced rearwardly until it engages bale 1, but without affecting either of the trip levers. Shuttle gate 30 having been closed behind bale 3, then shuttles bale 4 into chamber B where it idles past the main trip lever 62 as with the previous bale 2, but bale 4 trips the secondary trip lever 80 and holds it in tripped position with the conditioning rod 84 pushed forwardly as shown in Figure 6a, to elevate the main trip rod 72 for engagement upon the next movement of the pawl 67.

Bale 5 then repeats the course of bales 1 and 3, being shuttled to chamber A without affecting the trip mechanisms, but when bale 6 enters the cage as seen diagrammatically in Figure 7, it is shuttled to chamber B and, the main trip rod 72, having been conditioned for engagement by the pawl 67, the rotation of the main trip lever 62 by the bale 6, causes the trip rod 72 to be pulled forwardly, releasing the latch 54 and discharging all six bales in proper alignment for subsequent picking up by a hydraulic loader. After the bales are discharged from the cage 8, the tail gate 51 is closed by gravity and automatically locked by latch 54 and the operation thus described is repeated.

It will thus be seen that I have provided a bale assembling and aligning device which is completely automatic in operation and designed to greatly facilitate the collection of bales of hay by arranging and depositing a predetermined number of bales in convenient alignment for subsequent gathering by a hydraulic loading mechanism or for that matter, hand loading on a wagon.

From the foregoing it is believed that my invention may be readily understood by those skilled in the art without further description, it being borne in mind that numerous changes may be made in the details of construction without departing from the spirit of the invention as set forth in the following claims.

What I claim is:

1. A bale assembler and aligner, comprising an elongated bottomless cage adapted to be pulled along the ground by a baling machine, said cage having an entrance opening at its forward end, aligned to receive and rearwardly direct, bales discharged from said baling machine, a tail gate at the opposite end of said cage, a latch for said tail gate, carried by said cage, a trip rod connected to said latch, a trip lever pivotally mounted on said cage in the path of movement of rearwardly directed bales and intermittently operable by transient bales as they enter said cage, connecting means associated with said trip lever, engageable with but normally disengaged from said trip rod, and means operable by a bale in predetermined sequence, for conditioning said trip rod for operative engagement by said connecting means upon the subsequent actuation of said trip lever by a succeeding bale.

2. A bale assembler and aligner, comprising an elongated bottomless cage adapted to be pulled along the ground by a baling machine, said cage having an entrance opening at its forward end, aligned to receive and rearwardly direct, bales discharged from said baling machine, a tail gate at the opposite end of said cage, a latch for said tail gate, carried by said cage, a trip rod connected to said latch, a primary trip lever pivotally mounted on said cage in the path of movement of rearwardly directed bales and intermittently operable by transient bales as they enter said cage, connecting means associated with said trip lever, engageable with but normally disengaged from said trip rod, a secondary trip lever pivotally mounted on said cage in the path of movement of said bales, and intermittently operable by a bale entering said cage in predetermined sequence, and a conditioning rod operatively connected to said secondary lever at one end, with its opposite end engageable with said trip rod and adapted, upon actuation of said secondary trip lever, to condition said trip rod for operative engagement by said connecting means, upon the subsequent actuation of said primary trip lever by a succeeding bale.

3. A bale assembler and aligner, comprising an elongated bottomless cage adapted to be pulled along the ground by a baling machine, said cage having an entrance opening at its forward end, aligned to receive and rearwardly direct, bales discharged from said baling machine, a tail gate at the opposite end of said cage, a latch for said tail gate, carried by said cage, a trip rod pivotally connected to said latch and extending forwardly therefrom, a primary trip lever pivotally mounted on said cage in the path of movement of rearwardly directed bales and intermittently operable by transient bales as they enter said cage, connecting means associated with said trip lever, engageable with but normally disengaged from the forwardly projecting end of said trip rod, a secondary trip lever located posterior to said primary lever, pivotally mounted on said cage in the path of movement of said bales and intermittently operable by a bale entering said cage in predetermined sequence, and a conditioning rod connected to said secondary lever at one end with its opposite end extending forwardly for engagement with said trip rod, and adapted, upon actuation of said secondary trip lever, to condition said trip rod for operative engagement by said connecting means upon the subsequent actuation of said primary trip lever by a succeeding bale.

4. Apparatus as claimed in claim 3, wherein the connecting means associated with said primary trip lever includes a pawl mechanism, the forwardly projecting end of said trip rod normally lying below said pawl mechanism and out of line for engagement thereby, the forwardly projecting end of said conditioning rod underlying the corresponding end of said trip rod and adapted, upon actuation of said secondary trip lever, to elevate said trip rod for engagement by said pawl mechanism.

5. A bale assembler and aligner, comprising an elongated bottomless cage adapted to be pulled along the ground by a baling machine, a central partition dividing said cage into two parallel, longitudinally extending chambers, means at the forward end of said cage for directing succeeding bales discharged from said baling machine, into alternate chambers, a common tail gate at the discharge end of said chambers, a latch for said tail gate, a trip rod connected to said latch, primary trip lever intermittently operable carried by said cage, and means for releasing said latch.

6. A bale assembler and aligner, comprising an elongated, bottomless cage adapted to be pulled along the ground by a baling machine, a longitudinally extending central partition, dividing said cage into two parallel chambers having juxtaposed entrance openings at their forward ends, to receive bales delivered from said baling machine, a shuttle gate pivoted on a vertical axis adjacent the forward end of said partition, and adapted to be swung from side to side, to diagonally obstruct either entrance opening, means operable by a bale as it passes through either entrance opening, for closing said shuttle gate against that opening, to automatically direct the succeeding bale to the alternate entrance opening, a common tail gate at the opposite end of said cage, closing both chambers, a latch for said tail gate, carried by said cage, and means for releasing said latch.

7. Apparatus as claimed in claim 6, wherein said shuttle gate is spring loaded and said means for closing the shuttle gate, comprises a cross bar eccentrically mounted with respect to the pivoted axis of said shuttle gate, for pivotal movement into either entrance opening, and spring means connecting the central portion of said cross bar to the opposite end of said shuttle gate, to swing the gate in response to the movement of the cross bar.

8. Apparatus as claimed in claim 5, wherein said cage is mounted on skids for sliding movement across the ground.

9. Apparatus as claimed in claim 5, wherein the major portion of said cage is supported on skids for sliding movement across the ground, the forward portion of said cage being mounted on casters, and means hingedly connecting said forward portion to the discharge end of a baling machine.

10. A bale assembler and aligner, comprising a bottomless cage adapted to be pulled along the ground by a baling machine, a central partition dividing said cage into two parallel, longitudinally extending chambers, means at the forward end of said chambers for directing succeeding bales discharged from said baling machine, into alternate chambers, a common tail gate for said chambers, a latch for said tail gate carried by said cage, and means on said cage, operable by a transient bale in predetermined sequence in one of said chambers, for releasing the latch to simultaneously discharge all bales from both chambers.

References Cited in the file of this patent

UNITED STATES PATENTS

| | | |
|---|---|---|
| 2,453,384 | Renken | Nov. 9, 1948 |
| 2,531,560 | De Wall | Nov. 28, 1950 |
| 2,689,055 | Kizer et al. | Sept. 14, 1954 |

FOREIGN PATENTS

| | | |
|---|---|---|
| 628,093 | Great Britain | Aug. 22, 1949 |